United States Patent
Hua et al.

(10) Patent No.: US 9,621,221 B2
(45) Date of Patent: Apr. 11, 2017

(54) METHODS FOR CANCELLATION OF RADIO INTERFERENCE IN WIRELESS COMMUNICATION SYSTEMS

(71) Applicant: THE REGENTS OF THE UNIVERSITY OF CALIFORNIA, Oakland, CA (US)

(72) Inventors: Yingbo Hua, Riverside, CA (US); Ping Liang, Riverside, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 14/891,804

(22) PCT Filed: May 21, 2014

(86) PCT No.: PCT/US2014/039031
§ 371 (c)(1),
(2) Date: Nov. 17, 2015

(87) PCT Pub. No.: WO2014/190088
PCT Pub. Date: Nov. 27, 2014

(65) Prior Publication Data
US 2016/0105213 A1 Apr. 14, 2016

Related U.S. Application Data

(60) Provisional application No. 61/825,885, filed on May 21, 2013.

(51) Int. Cl.
*H03M 1/66* (2006.01)
*H04B 1/525* (2015.01)
(Continued)

(52) U.S. Cl.
CPC ............... *H04B 1/525* (2013.01); *H04L 5/14* (2013.01); *H04W 28/048* (2013.01)

(58) Field of Classification Search
CPC ......... H04B 1/525; H04W 28/048; H04L 5/14
(Continued)

(56) References Cited

U.S. PATENT DOCUMENTS 5,691,978 A   11/1997 Kenworthy
6,429,798 B1   8/2002 Dent
(Continued)

OTHER PUBLICATIONS

International Search Report on corresponding PCT application (PCT/US2014/039031) from International Searching Authority (USPTO) dated Sep. 24, 2014.
(Continued)

*Primary Examiner* — Brian Young
(74) *Attorney, Agent, or Firm* — Klein, O'Neill & Singh, LLP (57) ABSTRACT

A full duplex radio includes self-interference cancellation circuitry for reducing self-interference. The self-interference cancellation circuitry may receive analog radio frequency signals that are to be transmitted by an antenna, and down-convert and digitize the signals to provide a digital baseband signal for processing, for example by an adaptive filter. The filtered signal may be converted to an analog signal and applied in an analog portion of a receive chain of a receiver of the full duplex radio. Preferably the analog signal is applied in the receive chain after low noise amplification of received signals of interest.

15 Claims, 5 Drawing Sheets

(51) Int. Cl.
  *H04L 5/14*   (2006.01)
  *H04W 28/04*  (2009.01)

(58) Field of Classification Search
  USPC .................................................. 341/155, 144
  See application file for complete search history.

(56) References Cited

U.S. PATENT DOCUMENTS

| | | | | |
|---|---|---|---|---|
| 8,351,850 | B2* | 1/2013 | Van Aken | H04B 1/525 |
| | | | | 455/125 |
| 8,615,204 | B2* | 12/2013 | Husted | H04B 17/11 |
| | | | | 455/553.1 |
| 8,942,314 | B2* | 1/2015 | Aparin | H04B 1/0475 |
| | | | | 375/267 |
| 9,270,308 | B2* | 2/2016 | Chen | H04B 1/525 |
| 2004/0142700 | A1 | 7/2004 | Marinier | |
| 2006/0052124 | A1 | 3/2006 | Pottenger et al. | |
| 2007/0104254 | A1 | 5/2007 | Bottomley et al. | |
| 2008/0089397 | A1 | 4/2008 | Vetter et al. | |
| 2008/0107046 | A1 | 5/2008 | Kangasmaa et al. | |
| 2010/0022201 | A1 | 1/2010 | Vandenameele | |
| 2010/0232324 | A1 | 9/2010 | Radunovic et al. | |
| 2011/0143655 | A1 | 6/2011 | Ahn et al. | |
| 2012/0201153 | A1 | 8/2012 | Bharadia et al. | |
| 2012/0263078 | A1 | 10/2012 | Tung | |
| 2013/0089009 | A1 | 4/2013 | Li et al. | |

OTHER PUBLICATIONS

Written Opinion on corresponding PCT application (PCT/ US2014/ 039031) from International Searching Authority (USPTO) dated Sep. 24, 2014.

* cited by examiner

METHODS FOR CANCELLATION OF RADIO INTERFERENCE IN WIRELESS COMMUNICATION SYSTEMS

CROSS-REFERENCE TO RELATED APPLICATIONS

This application is the national phase entry, under 35 U.S.C. Section 371(c), of International Application No. PCT/US2014/039031, filed May 21, 2014, claiming priority from U.S. Provisional Application No. 61/825,885, filed May 21, 2013. The disclosures of the International Application and the U.S. Provisional Application from which this application claims priority are incorporated herein by reference in their entireties.

FEDERALLY SPONSORED RESEARCH OR DEVELOPMENT

Not Applicable

BACKGROUND OF THE INVENTION

The present invention relates generally to full duplex radio communications, and more particularly to systems and method of cancelling self-interference in full duplex radio communications.

In full duplex radio communications a transceiver generally transmits and receives signals at the same time, and possibly at the same frequencies. Unfortunately, transmit portions of the transceiver may generate signals that interfere with reception of signals, either at the same frequency or different frequencies.

BRIEF SUMMARY OF THE INVENTION

In one aspect the invention provides a method of cancelling self-interference in a full duplex radio, comprising: providing an output of a transmission chain of the radio to a filter; filtering the output of the transmission chain; combining the filtered output with a received signal in an analog portion of a receive chain of the radio. In some such aspects filtering of the output of the transmission chain is performed by a transversal filter. In some such aspects providing a signal for transmission by the transmission chain in the absence of a desired signal transmitted to the receive chain from another radio, setting different parameters of the transversal filter to different values, determining which of the different values of the different parameters minimize an output of the receive chain, and setting the different parameters to the different values. In some such aspects the filtered output is combined with the received signal in a baseband portion of the receive chain. In some such aspects the filtered output is combined with the receive signal in a radio frequency (RF) portion of the receive chain. In some such aspects the output of the transmission chain is taken from an output of a power amplifier of the transmission chain. In some such aspects filtering of the output of the transmission chain is performed by a first transversal filter, wherein the filtered output is combined with the received signal in a radio frequency (RF) portion of the receive chain; and further comprising: filtering an input to the first transversal filter using a second transversal filter, and combining the filtered output of the second transversal filter with a received signal in the receive chain.

In another aspect the invention provides a full duplex radio, comprising: a transmit chain including a digital-to-analog converter (DAC), a radio frequency (RF) mixer, and a power amplifier; a receive chain including a low noise amplifier (LNA), an RF mixer, and an analog-to-digital converter (ADC); and self-interference cancellation circuitry including a transversal filter coupled between an output of the power amplifier of the transmit chain and the receive chain. In some such aspects the self-interference cancellation circuitry is coupled to a baseband portion of the receive chain. In some such aspects the self-interference cancellation circuitry is coupled to a radio frequency portion of the receive chain.

In another aspect the invention provides a method of cancelling self-interference in a full duplex radio, comprising: converting a radio frequency (RF) analog output signal of a transmission chain of the radio to a digital baseband signal; digitally filtering the digital baseband signal using a digital adaptive filter; converting the digitally filtered signal to an analog signal; and combining the analog signal with a received signal from another radio in an analog portion of a receive chain of the radio.

In another aspect the invention provides a full duplex radio, comprising: a transmit chain including a digital-to-analog converter (DAC), a radio frequency (RF) mixer, and a power amplifier; a receive chain including a low noise amplifier (LNA), an RF mixer, and an analog-to-digital converter (ADC); and self-interference cancellation circuitry including a digital adaptive filter coupled between an output of the power amplifier of the transmit chain and the receive chain.

These and other aspects of the invention are more fully comprehended upon review of this disclosure.

DETAILED DESCRIPTION OF THE INVENTION

Figure 1:
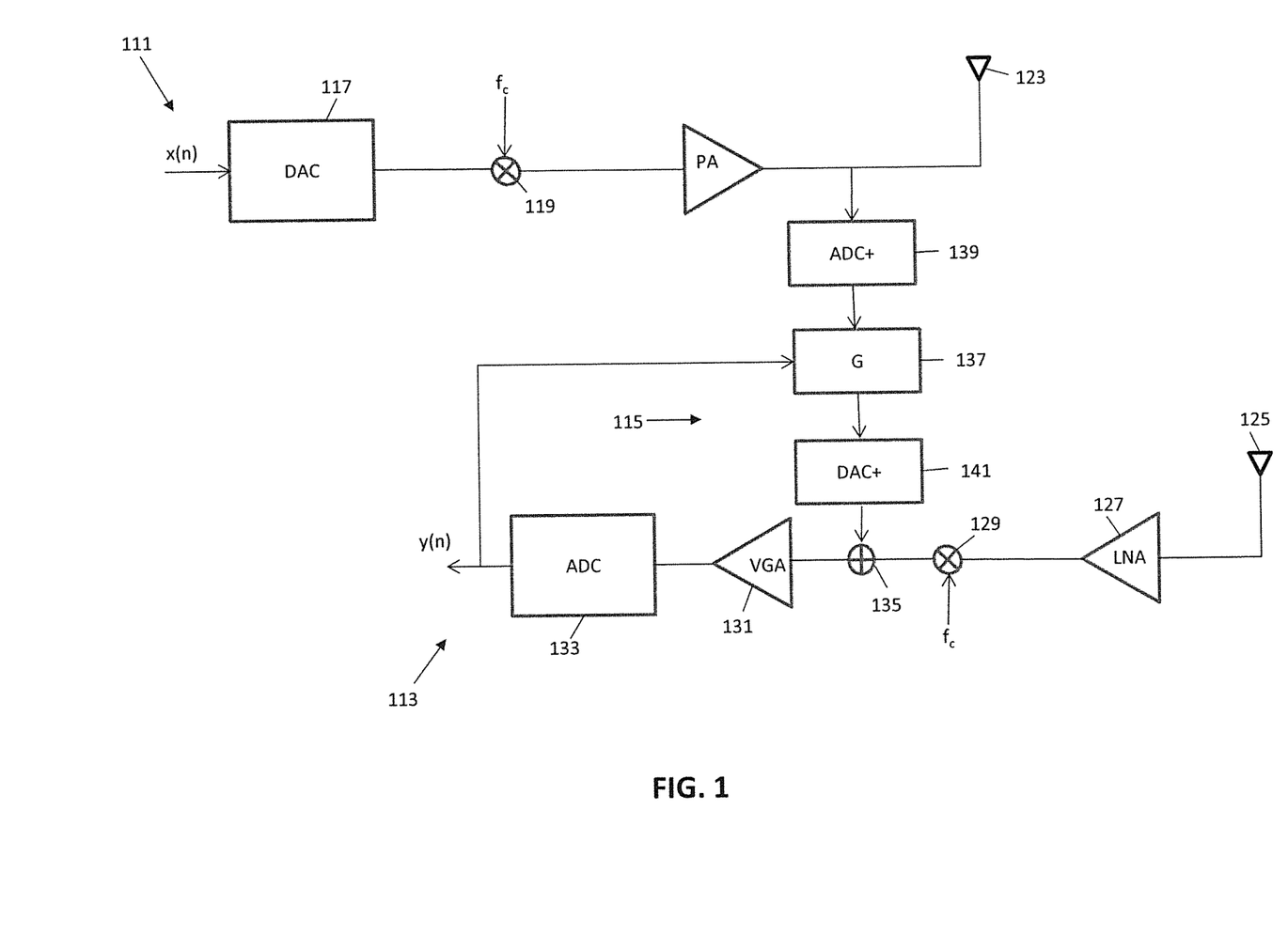
FIG. 1 is a block diagram of a full duplex radio with self-interference cancellation circuitry in accordance with aspects of the invention.

FIG. 1 is a block diagram of portions of an example full duplex wireless transceiver in accordance with aspects of the invention. The block diagram of FIG. 1 is primarily provided as an example to allow for increased comprehension of discussion of system transfer block diagrams discussed further below. One of skill in the art, including one of ordinary skill in the art, is able to translate the system block diagrams discussed below into the block diagram of FIG. 1 or such other block diagrams as appropriate, and would necessarily understand that discussion of the system transfer block diagrams conveys the information of block diagrams of the type shown in FIG. 1.

The wireless transceiver of FIG. 1 includes a transmit chain 111 and a receive chain 113. Self-interference cancellation circuitry 115 couples the transmit chain and the receive chain. In many embodiments the self-interference cancellation circuitry may be considered as providing a closed loop system, and corresponding methods, for canceling self interference in a full duplex radio.

The transmit chain receives a baseband digital input signal x(n). The input signal is converted to analog form by a digital-to-analog converter (DAC) 117, upconverted to transmission frequencies by an RF mixer 119, and amplified by a power amplifier 121 for transmission over a transmit antenna 123.

The receive chain receives over the air signals by way of a receive antenna 125. In various embodiments, however, the transmit antenna and the receive antenna may be provided as the same antenna, with for example an RF circulator used to separate signals on the transmit and receive path. The over the air signals will generally include a signal of interest transmitted by some other transmitter and intended for the receiver, a signal that in its baseband digital form may be considered s(n).

The receive chain amplifies signals received by its antenna by a low noise amplifier (LNA) 127, downconverts the signal to baseband using an RF mixer 129, further amplifies the signal using a variable gain amplifier (VGA), and converts the analog signal to a digital signal using an analog-to-digital converter 133. The digital signal may be considered an output signal y(n), and y(n) preferably is the same as the desired signal s(n). Unfortunately, absent other circuit elements, the output signal will generally also include signals generated by the transmit chain, both purposefully and due to noise in the transmit chain.

Accordingly, in accordance with aspects of the invention, the receive chain also includes the self-interference cancellation circuitry 115, which provides a cancellation signal to the receive chain by way of a signal combiner 135. As illustrated in FIG. 1, the signal combiner is located between the downconverter and the VGA, although the VGA may be otherwise positioned in various embodiments. In various embodiments, however, the signal combiner may be positioned at other points in the receive chain, for example before the LNA, with processing and elements of the of the self-interference cancellation circuitry modified to provide signals at the appropriate frequency to the receive chain.

The self-interference cancellation circuitry includes an adaptive filter (G) 137. The adaptive filter may be, for example, a transversal filter of order L. The adaptive filter receives a signal taken from an output of the power amplifier of the transmit chain, and provides a signal to be inserted into the receive chain by the signal combiner. Preferably the adaptive filter operates in the baseband digital domain, and accordingly the block diagram of FIG. 1 includes preprocessing circuitry 139 for effectively downconverting and digitizing the output from the power amplifier, and postprocessing circuitry 141 for converting the output of the adaptive filter to an analog signal for insertion into an analog portion of the receive chain. The preprocessing circuitry may include, for example, a downconverter and a quantizer, for example an ADC. While the downconverter could include an RF mixer, preferably other components are used instead, for example a low frequency sampler and a low pass filter, to reduce circuit noise. In the event the signal combiner is positioned in the RF portion of the receive chain, upconversion circuitry would be included in the postprocessing circuitry.

In operation, parameters, for example tap weights, of the adaptive filter may be determined as part of a training procedure to reduce interference due to the transmit chain. For example, in some embodiments the transceiver may be operated in the absence of a desired received signal s(n), with the parameters of the adaptive filter varied to minimize noun squares of the output y(n), for example using a least mean square approach. Circuitry for performing this operation may be included within the adaptive filter, or external to the adaptive filter. In many such approaches timing of the training of the adaptive filter may be controlled by a processor of or associated with the transmit and receive chains, and a switch controlled by such a processor may only allow for provision of the output signals y(n) only when adaptive filter training is active.

Figure 2:
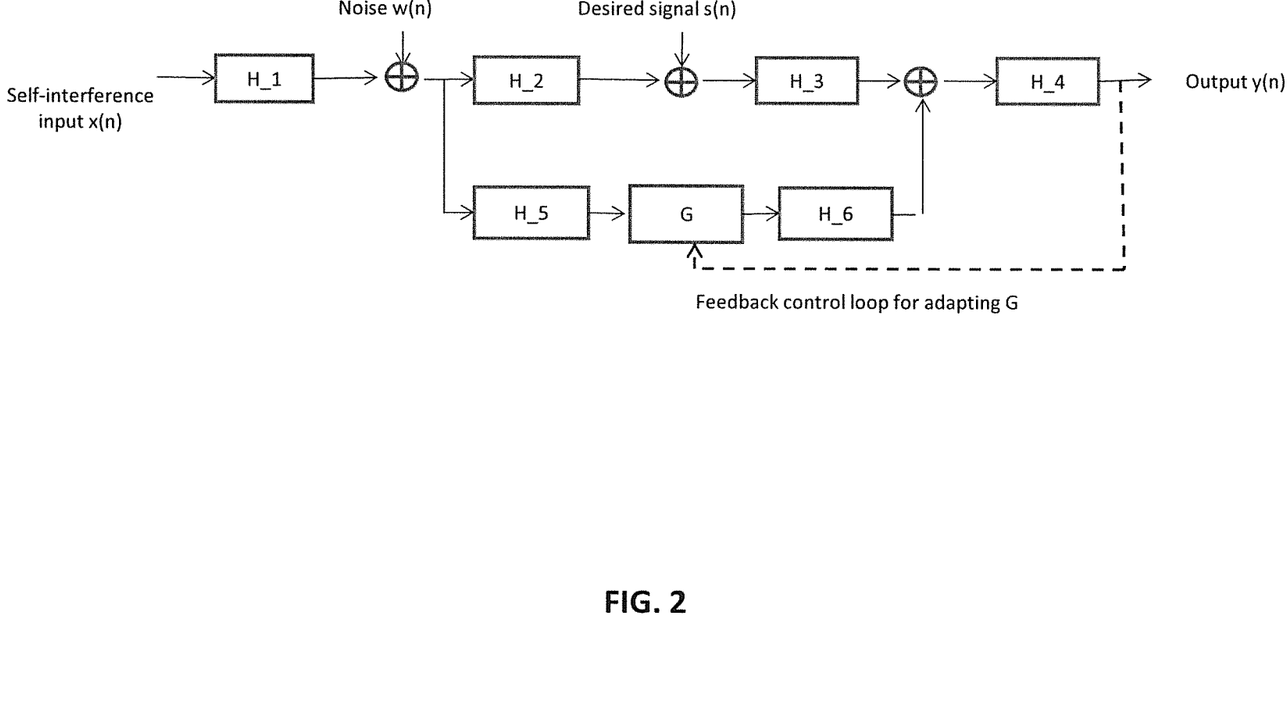
FIG. 2 is a block diagram illustrating a radio self-interference cancellation system and method in accordance with aspects of the invention.

FIG. 2 is a system transfer block diagram related to self-interference cancellation for full duplex radios in accordance with aspects of the invention. In FIG. 2, a signal x(n) is input to the system, and an output signal y(n) is produced by the system. The input signal x(n), which may be for example a digital baseband version of a signal to be transmitted by the radio, is operated on a transfer function H_1. The output of H_1 is combined with noise w(n), which may be representative of noise generated by a transmit chain, and provided to a upper path and a lower path. The upper path includes a transfer function H_2, whose output is combined with a desired signal s(n), which may be representative of a desired received signal, the combination of which is operated on by a transfer function H_3. The lower path includes, in series, transfer function H_5, transfer G and transfer function H_6. The outputs of the lower path and the upper path are combined, and provided to transfer function H_4. Transfer function H_1 may be representative of transmit chain circuitry, transfer function H_2 may be representative of an air path between the transmit antenna and the receive antenna (or of an isolation path of an RF circulator when one antenna is used), transfer functions H_3 and H_4 may be representative of receive chain circuitry, and transfer functions H_5, G, and H_6 may be representative of self-interference cancellation related circuitry.

In FIG. 2, all of the H transfer functions (H_1 to H_6) can be unknown but of a sufficient coherence time T_c. The input (digital) signal x(n) can be controlled. The output (digital) signal y(n) can be measured. An adaptive digital filter G can be found such that the component y_1(n) in the output y(n) due to the input x(n) and the noise w(n) is minimized and the other component y_2(n) in the output y(n) due to the desired signal s(n) is the least contaminated by x(n) and w(n).

For applications in full-duplex radio, the actual meanings of the H functions can be described as follows.

H_1 represents the baseband-equivalent channel transfer function (or simply channel) between a digitally generated baseband waveform x(n) and the output of the RF (radio frequency) power amplifier in the transmit chain. The noise w(n) may represent a combination of all noises generated in the transmit chain, which include the quantization noise in generating the transmitted baseband waveform at DAC (digital-analog converter), the noise from the upconversion RF mixer, and the noise from the transmit power amplifier.

H_2 represents the baseband-equivalent channel transfer function (or simply channel) between the transmit antenna and the receive antenna when two separate antennas are used for transmit and receive. H_2 may also represent the equivalent baseband channel transfer function of the isolation path of a RF circulator when a single antenna is used along with the circulator for both transmit and receive.

H_3 represents the baseband-equivalent channel transfer function (or simply channel) between the receive antenna and a signal combiner, which can be either at the RF end before the LNA (low noise amplifier) or in the baseband region in the receive chain. A good choice of the signal combiner is a baseband analog signal combiner so that the signal generated by the lower path in the generic diagram does not have to be up-converted by a RF mixer which tends to be noisy. The latter choice is generally considered as being used in the discussion below.

H_4 is the channel between the signal combiner and the output y(n), which generally include VGA (variable gain amplifier) and/or ADC (analog-digital converter).

H_5 is the channel between the output of the transmit power amplifier and the input of the adaptive filter G, which could include a low-frequency sampler, a low pass filter and a quantizer (ADC). This avoids the use of a RF mixer for down conversion.

H_6 is the channel between the output of the adaptive filter G and the signal combiner, which generally includes a DAC.

The (cancelation) path comprised of H_5, G and H_6 should be relatively free from noise. When quantization is used, the largest possible number of quantization bits are preferably used.

For most applications, H_1, H_3, H_4, H_5 and H_6 are approximately all-pass with some delays while H_2 depends on the environment between the transmit antenna and the receive antenna. However, for high-quality interference cancelation, all H functions should be treated as unknowns while the parameters of G are optimized in minimizing interference in y(n).

One method for finding/training the parameters of G is to minimize the sum J of the norm squares of y(n) in the absence of s(n). In this case, J is a quadratic function of all complex parameters $g\_0, g\_1, \ldots, g\_L$ of G (chosen as a transversal filter of a given order L). The minimum of J can be found in principle by a sequential online search for $Re(g\_0), Im(g\_0), Re(g\_1), Im(g\_1), \ldots Re(g\_L), Im(g\_L)$ with multiple sweeps until convergence. Note that using the real parts and imaginary parts of the parameters of G keep the cost function quadratic, which is preferred for convergence.

Without noise, the golden section method for each real parameter would be an ideal method. But due to noise w(n), the cost is no longer a smooth function of any given parameter. Quadratic interpolation can be applied for each search direction.

Advantages of such an approach may, in some embodiments, include: 1) This method is a closed-loop, digitally controlled method for analog interference cancellation which adapts to any condition of the noise which is part of the signal driving the adaptive digital filter G; 2) This method is versatile and can be applied in various forms; 3) the method can be successively applied (as illustrated later) to reduce the interference at various stages in the receive chain so that the final output of the receive chain has the maximum possible signal-to-noise ratio.

Figure 3:
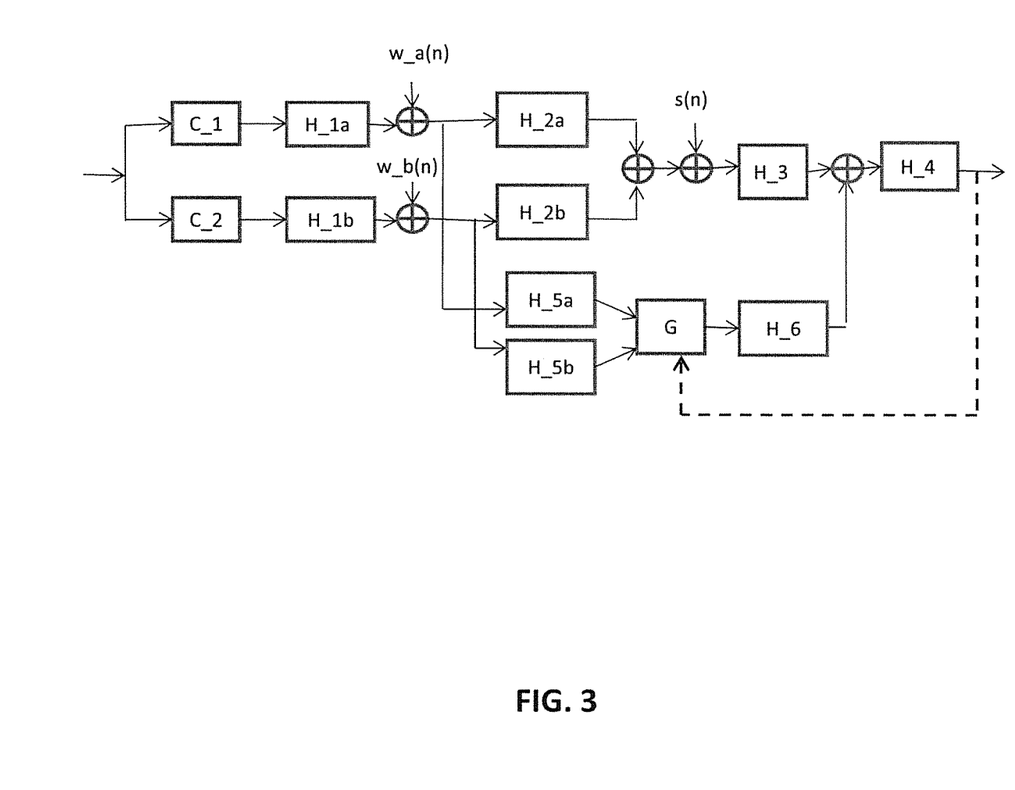
FIG. 3 is a block diagram of a further radio self-interference cancellation system and method in accordance with aspects of the invention.

To reduce the noise caused by LNA, it is desirable to reduce the interference at the RF frontend of the receiver. If time-domain transmit beamforming (TDTB) is used, the method shown in FIG. 2 can be applied as in FIG. 3. In FIG. 3, like transfer functions to those of FIG. 2 are indicated with like numbers, with duplications indicated by versions a,b.

In FIG. 3, C_a and C_b are waveform prefilters which are designed to reduce the self-interference at the RF frontend (at the sum before the desired signal s(n) in FIG. 3) of the receiver. Namely, in the absence of the noises w_a(n) and w_b(n), C_a and C_b are such that the two paths yield a zero net contribution at the sum before s(n) in FIG. 3. But with the noises w_a(n) and w_b(n), mostly due to the RF mixers and power amplifiers embedded in H_1a and H_1b, there can be a significant amount of residue interference.

To reduce the residue interference, an adaptive filter G with two inputs can be used as shown in FIG. 3.

Here, the roles of H_1a and H_1b are similar to that of H_1 in FIG. 1, those of H_2a and H_2b are similar to that of H_2 in FIG. 1, those of H_5a and H_5b are similar to that of H_5 in FIG. 1. In particular, the sum at the far right preferably should be a signal combiner in the baseband before the ADC in the receiver chain. Operation to determine parameters of G may be performed as discussed with respect to FIG. 1 or 2.

For MIMO full-duplex radio, there are potentially multiple transmit and receive chains one can use one adaptive filter (like G in FIGS. 1 and 2) for each receive chain, with the adaptive filter driven by the signals from all the outputs of the RF power amplifiers in various the transmit chains. The drawing is straightforward and omitted.

A successive use of the method shown in FIG. 1 is illustrated below. In systems represented by the block diagram of FIG. 4, two adaptive filters may be successively used to cancel interference. For example a first adaptive filter may be used primarily to cancel transmit chain noise, and a second adaptive filter may be used primarily to cancel transmit chain noise and noise due to an RF mixer and power amplifier in self-interference cancellation associated with the first postprocessing circuitry adaptive filter.

Figure 4:
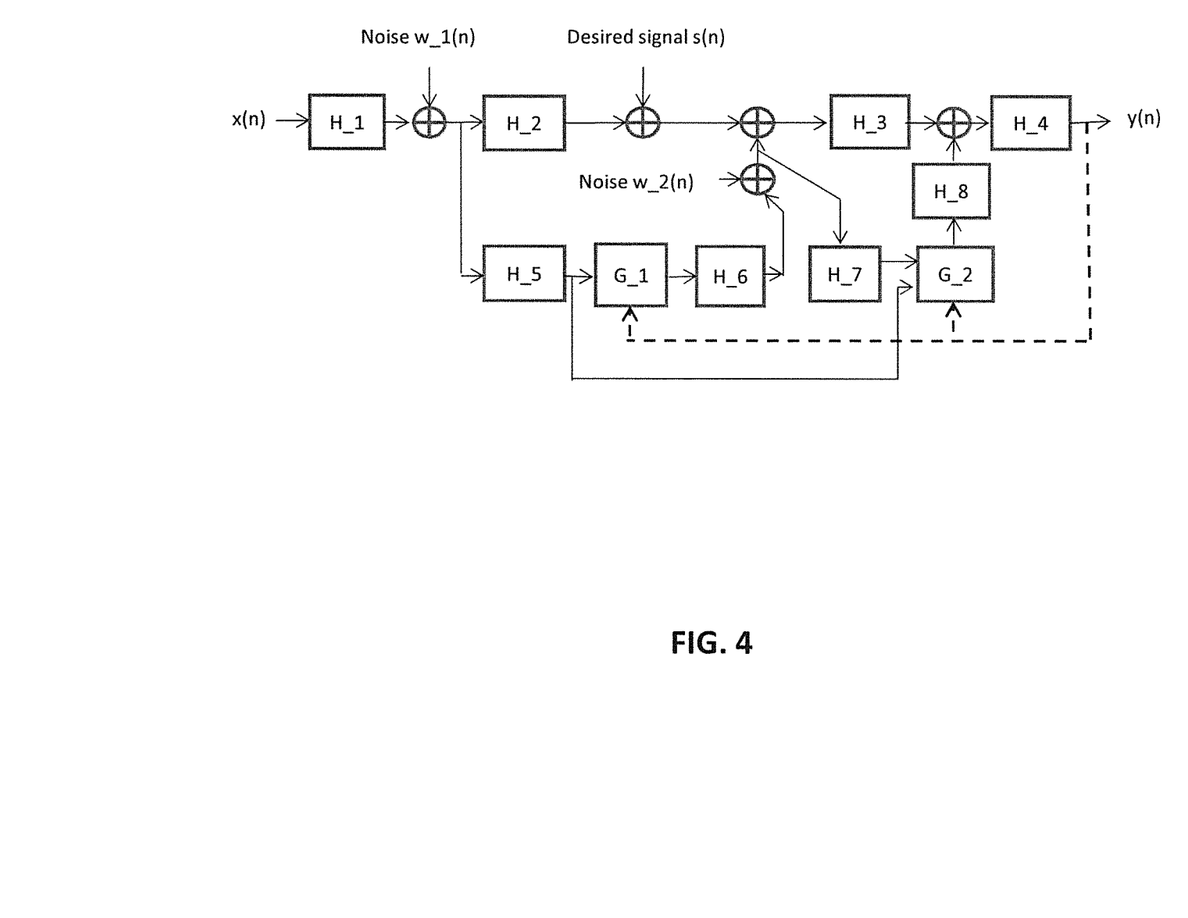
FIG. 4 is a block diagram of a further radio self-interference cancellation system and method in accordance with aspects of the invention.

The $3^{rd}$ sum in the top row can be a RF power combiner in the receive chain, which is for the first stage interference cancelation. The additional noise $w\_2(n)$ can be caused in the hardware path represented by H_6 which includes a RF mixer and a power amplifier.

The $4^{th}$ sum in the top row can be an analog baseband combiner before, or just before, the ADC in the receive chain, which is for the second stage interference cancelation. The hardware structure of H_7 is similar to that of H_5. The hardware structure of H_8 differs from that of H_6 since H_8 does not use an RF mixer or RF power amplifier.

For training the filters G_1 and G_2, G_1 may be first trained, with G_2 set to zero (inactive) initially, until y(n) is minimized in the absence of s(n). Then, G_1 may be kept unchanged, and G_2 trained with two inputs as shown in the figure until y(n) is further minimized in the absence of s(n). The two inputs to G_2 contain the contributions from both noises $w\_1(n)$ and $w\_2(n)$. It can be shown in principle that there exist G_1 and G_2 such that $w\_1(n)$ and $w\_2(n)$ have a zero net contribution to y(n). Basically, G_2 has two components G_2' and G_2" where G_2" effectively cancels $w\_2(n)$ at y(n) and G_2' effectively cancels x(n) and $w\_1(n)$ at y(n).

The two-stage structure is useful to keep the interference minimized at the two critical points: the LNA (part of H_3) and the ADC (part of H_4). With a low interference before the LNA, a high gain may be used for the LNA to amplify the (weak) desired signal. The noise figure of the LNA generally decreases with its gain. With a low interference before the ADC, the (weak) desired signal can get more bits for quantization, which reduces the quantization noise.

Figure 5:
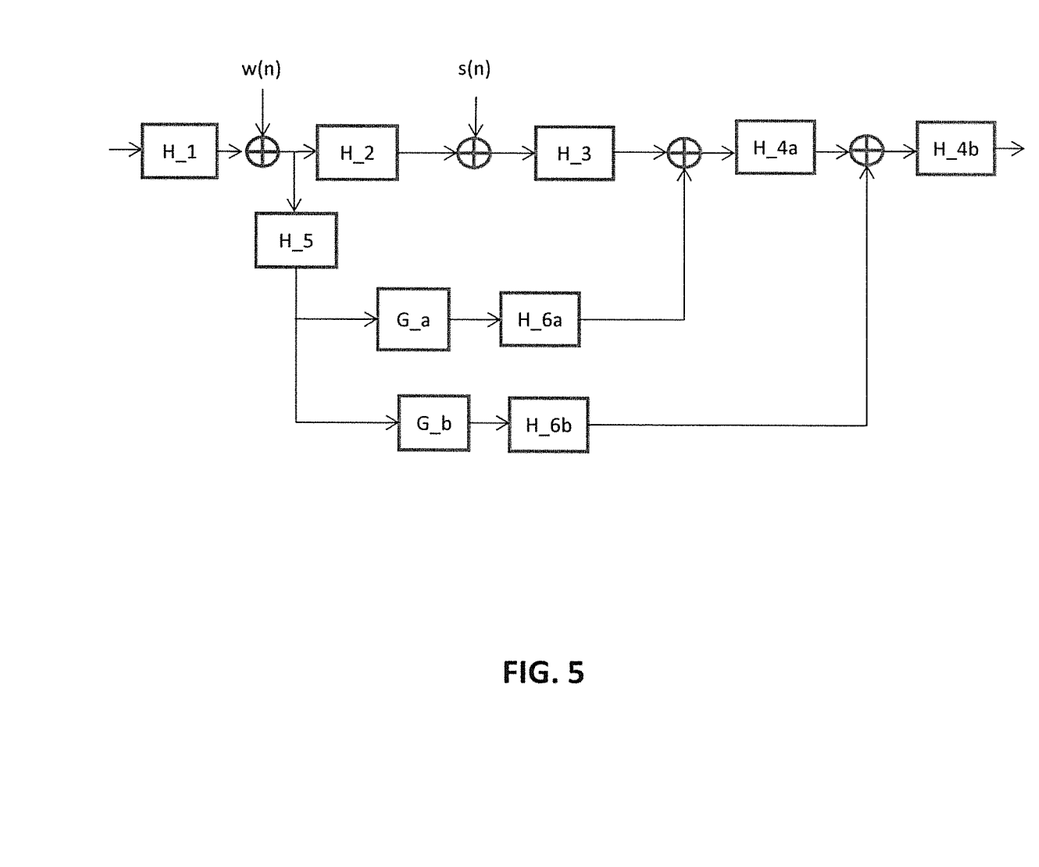
FIG. 5 is a block diagram of a further radio self-interference cancellation system and method in accordance with aspects of the invention.

A further successive use of the method is shown in FIG. 5.

In FIG. 5, the $3^{rd}$ sum can be a RF power combiner in the receive chain. the $4^{th}$ sum can be just before the ADS in the receive chain.

In summary, aspects of the invention provide a closed-loop, digitally controlled, and analog interfaced method for cancelling interferences from a set of RF transmit chains to a set of RF receive chains. This invention can be used typically to recover a weak signal in the presence of a stronger signal transmitted such as in full-duplex radios. While the cancelation is suggested at analog signal combiners at RF and/or baseband, the real-time signal control and real-time filter training may be fully digital. The method can be used in parallel and/or serial for better combined effect. Interference and major noise sources in the system are tapped with low noise devices and used as part of the input(s) to drive the adaptive digital filter(s). The final structure of the system is such that all interference and major noise sources have a zero or minimum net contribution to the received digital signals.

Although the invention has been discussed with respect to various embodiments, it should be recognized that the invention comprises the novel and non-obvious claims supported by this disclosure.

What is claimed is:

1. A method of cancelling self-interference in a full duplex radio, comprising:
   converting a radio frequency (RF) analog output signal of a transmission chain of the radio to a digital baseband signal;
   digitally filtering the digital baseband signal using a digital adaptive filter;
   converting the digitally filtered signal to an analog signal;
   combining the analog signal with a received signal from another radio in an analog portion of a receive chain of the radio.

2. The method of claim 1, wherein the digital adaptive filter comprises a first tranversal filter.

3. The method of claim 2, wherein at least some of the parameters of the first transversal filter are set by a process comprising:
   providing a signal for transmission by the transmission chain in the absence of a desired signal transmitted to the receive chain from another radio;
   setting different parameters of the first transversal filter to different values;
   determining which of the different values of the different parameters minimize an output of the receive chain; and
   setting the different parameters to the different values.

4. The method of claim 1, wherein the analog signal is combined with the received signal in a baseband portion of the receive chain.

5. The method of claim 1, wherein the filtered output is combined with the received signal in an RF portion of the receive chain.

6. The method of claim 1, wherein the RF analog output signal of the transmission chain is taken from an output of a power amplifier of the transmission chain.

7. The method of claim 1, wherein the digital adaptive filter comprises a first transversal filter;
   wherein the filtered output is combined with the received signal in a radio frequency (RF) portion of the receive chain; and
   further comprising:
   filtering an input to the first transversal filter using a second transversal filter; and
   combining the filtered output of the second transversal filter with a received signal in the receive chain.

8. The method of claim 1, further comprises:
   waveform prefiltering an input signal to the transmission chain;
   generating the RF analog output signal of the transmission chain using the waveform prefiltered input signal.

9. A full duplex radio, comprising:
   a transmit chain including a digital-to-analog converter (DAC), a radio frequency (RF) mixer, and a power amplifier;
   a receive chain including a low noise amplifier (LNA), an RF mixer, and an analog-to-digital converter (ADC); and
   self-interference cancellation circuitry including a digital adaptive filter coupled between an output of the power amplifier of the transmit chain and the receive chain;
   wherein the self-interference cancellation circuitry is coupled to a baseband portion of the receive chain.

10. A full duplex radio, comprising:
    a transmit chain including a digital-to-analog converter (DAC), a radio frequency (RF) mixer, and a power amplifier;
    a receive chain including a low noise amplifier (LNA), an RF mixer, and an analog-to-digital converter (ADC); and
    self-interference cancellation circuitry including a digital adaptive filter coupled between an output of the power amplifier of the transmit chain and the receive chain;
    wherein the self-interference cancellation circuitry including the digital adaptive filter comprises a transversal filter.

11. A full duplex radio, comprising:
    a transmit chain including a digital-to-analog converter (DAC), a radio frequency (RF) mixer, and a power amplifier;
    a receive chain including a low noise amplifier (LNA), an RF mixer, and an analog-to-digital converter (ADC); and
    self-interference cancellation circuitry including a digital adaptive filter coupled between an output of the power amplifier of the transmit chain and the receive chain;
    wherein the self-interference cancellation circuitry further comprises preprocessing circuitry for downconverting and digitizing the output of the power amplifier and postprocessing circuitry for converting an output of the digital adaptive filter to an analog signal.

12. The full duplex radio of claim 11, wherein the preprocessing circuitry includes a downconverter and a quantizer.

13. The full duplex radio of claim 12, wherein the quantizer comprises an analog-to-digital converter (ADC).

14. The full duplex radio of claim 11, wherein the preprocessing circuitry includes a low frequency sampler and a low pass filter.

15. A full duplex radio, comprising:
    a transmit chain including a digital-to-analog converter (DAC), a radio frequency (RF) mixer, and a power amplifier;
    a receive chain including a low noise amplifier (LNA), an RF mixer, and an analog-to-digital converter (ADC); and
    self-interference cancellation circuitry including a digital adaptive filter coupled between an output of the power amplifier of the transmit chain and the receive chain;
    wherein the transmit chain includes a waveform prefilter.

* * * * *